US012269185B2

(12) United States Patent
Chabirand-Garconnet et al.

(10) Patent No.: US 12,269,185 B2
(45) Date of Patent: Apr. 8, 2025

(54) METHOD FOR DETERMINING COMPONENTS OF A MECHANICAL ACTION TORSOR AT THE GUIDING POINT OF A CUTTING BLADE FOR A CUTTING MACHINE

(71) Applicants: LECTRA, Paris (FR); AMVALOR, Paris (FR); UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); ECOLE NATIONALE SUPERIEURE D'ARTS ET METIERS (ENSAM), Paris (FR)

(72) Inventors: Didier Chabirand-Garconnet, Cestas (FR); Olivier Cahuc, Canejan (FR); Quentin Cosson-Coche, Le Pian sur Garonne (FR); Philippe Darnis, Louchats (FR); Raynald Laheurte, Gradignan (FR); Denis Teissandier, Canejan (FR)

(73) Assignees: LECTRA, Paris (FR); AMVALOR, Paris (FR); UNIVERSITE DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); ECOLE NATIONALE SUPERIEURE D'ARTS ET METIERS (ENSAM), Paris (FR)

( * ) Notice: Subject to any disclaimer, the term of this patent is extended or adjusted under 35 U.S.C. 154(b) by 354 days.

(21) Appl. No.: 17/914,165

(22) PCT Filed: Mar. 23, 2021

(86) PCT No.: PCT/FR2021/050499
§ 371 (c)(1),
(2) Date: Jan. 31, 2023

(87) PCT Pub. No.: WO2021/198586
PCT Pub. Date: Oct. 7, 2021

(65) Prior Publication Data
US 2023/0226712 A1 Jul. 20, 2023

(30) Foreign Application Priority Data
Mar. 31, 2020 (FR) ....................................... 2003227

(51) Int. Cl.
*B26F 1/38* (2006.01)
*B26D 5/00* (2006.01)

(52) U.S. Cl.
CPC .............. *B26F 1/382* (2013.01); *B26D 5/005* (2013.01)

(58) Field of Classification Search
CPC ........... B26F 1/382; B26D 5/005; B26D 5/00; B23C 5/10; B23C 2260/76; B23Q 17/09;
(Continued)

(56) References Cited

U.S. PATENT DOCUMENTS 1,755,849 A * 4/1930 Clyde ........................ G01L 5/08 177/208
3,849,712 A 11/1974 Lankford et al.
(Continued)

FOREIGN PATENT DOCUMENTS

BR 102012012545 A2 * 12/2014 ............. B26D 1/382
CN 207717322 U * 8/2018 ............. B26D 1/382
(Continued)

OTHER PUBLICATIONS

International Search Report from corresponding PCT Application No. PCT/FR2021/050499, May 28, 2021.
(Continued)

*Primary Examiner* — Ghassem Alie
(74) *Attorney, Agent, or Firm* — Workman Nydegger

(57) ABSTRACT

The invention relates to a method for determining components of a mechanical action torsor at the guiding point of a
(Continued)

cutting blade (L) for a cutting machine, the blade being guided in a presser foot (P) of a cutting head of the machine, the method comprising the positioning of a five-component dynamometer on the presser foot, the dynamometer comprising a plurality of sensors for determining a frontal force, a lateral force, a rolling moment, a pitching moment and a yawing moment of the cutting blade, the establishment of a calibration matrix of the dynamometer, and the determination of the forces in three dimensions to which the cutting blade is subjected, on the basis of the measurements obtained by the sensors and the calibration matrix.

9 Claims, 2 Drawing Sheets

(58) Field of Classification Search
CPC .... G05B 19/94065; G05B 2219/37355; G05B 2218/50347; G01L 3/3128; G01L 5/08; Y10T 83/949
USPC .................................................. 83/13; 30/275
See application file for complete search history.

(56) References Cited

U.S. PATENT DOCUMENTS

2009/0314104 A1* 12/2009 Lohr ..................... G01L 3/1428 73/862.338
2010/0132528 A1* 6/2010 Schaffner .................. B23C 5/00 83/522.11

FOREIGN PATENT DOCUMENTS

CN 207900658 U * 9/2018 ............. B26D 1/382
EP 3593749 A1 1/2020
IT 201700023745 A1 9/2018

OTHER PUBLICATIONS

French Search Report from corresponding French Application No. FR2003227, Dec. 9, 2020.

* cited by examiner

METHOD FOR DETERMINING COMPONENTS OF A MECHANICAL ACTION TORSOR AT THE GUIDING POINT OF A CUTTING BLADE FOR A CUTTING MACHINE

TECHNICAL FIELD

The present invention relates to the general field of automatic cutting, by a vibrating blade, of a flexible material placed on a cutting table in the form of a single ply or a stack of plies. More precisely, it relates to a method for determining components of a mechanical action torsor at the guiding point of such a cutting blade.

PRIOR ART

A field of application of the invention is that of automatic cutting of parts in a flexible textile or non-textile material (such as leather), in particular in the clothing, furniture or automobile upholstery industries.

A known method for the automatic cutting of parts in a flexible material consists in providing the material on a fixed or mobile cutting support of the cutting table, in the form of a single ply or a stack of plies forming a mattress, and cutting the parts by means of a cutting head moving above the cutting support of the table. The cutting head bears, in particular, a vibrating steel blade which is vibrated vertically in the direction of its cutting edge in order to cut the material.

During this vertical vibration and during the cutting of the material, the cutting blade is subjected to many forces which affect the quality of the cut edges of the parts. In particular, these forces have a direct impact on the cutting quality and on the geometry of the cut parts over the entire height of the material, in particular when this is formed of a stack of plies.

Also, in order to be able to act on the cutting parameters and on the orientation of the blade, it is necessary to know, as well as possible, the strains to which the cutting blade is subject.

To this effect, it is known to position a bending sensor on the presser foot of the cutting head. In this way, this sensor can collect data relating to the lateral bending of the cutting blade and thus act on the cutting parameters and orientation of the blade in order to correct it. Reference can be made, for example, to patent application IT 102017000023745 in the name of Morgan Tecnica.

However, these data are not sufficient and do not take account of all the forces to which the cutting blade is subjected.

DISCLOSURE OF THE INVENTION

The main object of the present invention is therefore that of providing a method for determining all the forces to which the cutting blade is subjected, in order to enable finer and more autonomous control of the cutting.

According to the invention, this object is achieved through a method for determining components of a mechanical action torsor at the guiding point of a cutting blade for a cutting machine, the blade being guided in a presser foot of a cutting head of the machine, the method comprising:

- positioning a six-component dynamometer on the presser foot, the dynamometer comprising a plurality of sensors capable of determining a frontal force, a lateral force, a rolling moment, a pitching moment and a yawing moment of the cutting blade;

- establishing a calibration matrix of the dynamometer; and
- determining the forces in three dimensions to which the cutting blade is subjected, on the basis of measurements obtained by the sensors and the calibration matrix.

The method according to the invention is characterised in that it can determine the forces to which the blade is subjected in the three directions on the basis of a dynamometer installed in the presser foot of the cutting head. In particular, five of the six components of the mechanical action torsor at the guiding point of the blade can be determined, namely: frontal force, lateral force, rolling moment, pitching moment and yawing moment (the force along the main axis of the blade being excluded). In this way, on the basis of these data, it is possible to ensure a particularly precise and autonomous control of the cutting parameters in order to correct the defects.

The step of developing the calibration matrix of the dynamometer preferably comprises developing a theoretical calibration matrix of the sensors of the dynamometer at various theoretical stresses as a function of the six components of the dynamometer.

The step of developing the calibration matrix of the dynamometer likewise preferably further comprises, on the basis of the theoretical calibration matrix and measurements of the actual response of the sensors of the dynamometer, calculating a response matrix of the sensors of the dynamometer at various actual stresses as a function of the six components of the dynamometer.

The response matrix of the sensors of the dynamometer is calculated by a linear optimisation method.

In an embodiment, the dynamometer comprises three triaxial piezoelectric sensors which are mounted in the presser foot, being distributed around a longitudinal axis of the blade.

In a second embodiment, the dynamometer comprises at least three—and preferably six—coupled strain gauge bridges which are mounted on arms of the presser foot regularly distributed around a longitudinal axis of the blade in order to form at least three—and preferably six—full bridges.

In a third embodiment, the dynamometer comprises at least five full bridges of decoupled strain gauges which are mounted in the presser foot.

Whatever the embodiment, the transmission of measurements from sensors of the dynamometer can be performed contact free or by wire.

DESCRIPTION OF THE EMBODIMENTS

The invention applies to the automated cutting of parts in a flexible material having the form of a single ply or a stack of plies.

Such a cutting operation is generally performed by means of a cutting machine equipped with a horizontal cutting support on which the flexible material to be cut is provided.

A cutting head bearing a vibrating blade is mounted on a gantry which is caused to move along the cutting support while the cutting head moves simultaneously along the gantry so as to be able to follow the various cutting paths calculated by a cutting software.

Figure 1:
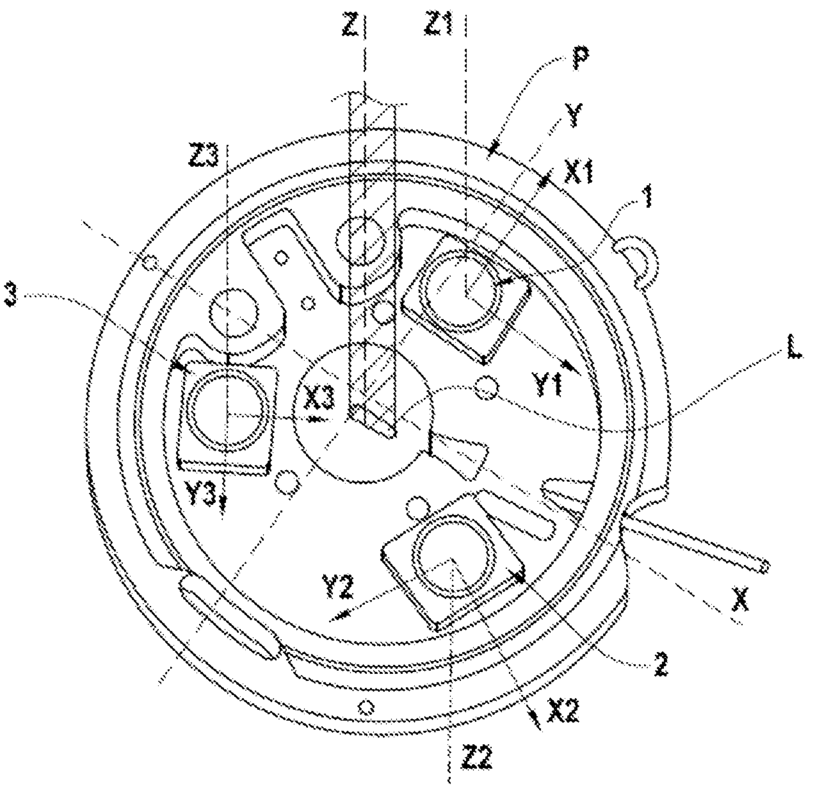
FIG. 1 is a schematic view showing a first embodiment of implementation of the method according to the invention.

Typically, a presser foot, such as that shown in FIG. 1, is mounted on the lower portion of the cutting head in order to apply a controlled force to the flexible material on its cutting support during cutting, the position of this presser foot being adjustable according to the height of the flexible material placed on the cutting support. Hence, the presser foot enables guiding of the cutting blade to be kept as close as possible to the flexible material.

The invention proposes a method for determining components of a mechanical action torsor at the guiding point of the vibrating blade of such a cutting head.

Several implementation alternatives of the method according to the invention are possible.

According to an embodiment shown schematically in FIG. 1, the method envisages positioning a five-component piezoelectric dynamometer on the presser foot P of the cutting head.

More precisely, the piezoelectric dynamometer comprises three triaxial piezoelectric sensors 1 to 3 which are mounted on the presser foot P, preferably being distributed regularly around a longitudinal axis Z of the cutting blade L.

The piezoelectric sensors 1 to 3 are advantageously distributed at 120° being equidistant from the centre of the dynamometer. As shown in FIG. 1, their Z axes ($Z_1$, $Z_2$ and $Z_3$ respectively) are directed downwards (in other words towards the cutting support), their Y axes ($Y_1$, $Y_2$ and $Y_3$ respectively) are directed towards the outside of the dynamometer in order to facilitate the passage of cables, and their X axes ($X_1$, $X_2$ and $X_3$ respectively) are parallel to the radii of the dynamometer.

This arrangement enables a good incorporation of the sensors in the environment of the presser foot while guaranteeing good rigidity thereof.

An upper plate (not shown in FIG. 1) closes the dynamometer incorporated in the presser foot. It has holes for the passage of screws enabling biasing of the sensors by compressing them between the upper plate and the bottom of the presser foot.

The first step of the method according to the invention for determining forces in 3D to which the cutting blade is subjected, is to perform a calibration of the piezoelectric dynamometer thus mounted on the presser foot.

This calibration consists in establishing a calibration matrix which makes it possible to interpret the various measurement voltages sent by the piezoelectric sensors 1 to 3 as mechanical forces.

First, a theoretical or overall calibration matrix should be produced, which is sensitive to the orientation and geometry of the sensors. Second, this theoretical calibration matrix should be refined to give a response matrix corresponding to the actual calibration matrix.

The consideration of the theoretical calibration matrix takes place in a context where all the geometric shapes are assumed to be perfect and without defect, following an ideal positioning of the axes. It is useful to represent the positioning of the three triaxial sensors in the space (X,Y,Z), in order to express the torsor of the mechanical actions attached to them.

An orthogonal reference frame (xi, yi, zi) is attached to each sensor i at its centre Oi. The torsor of the actions at Oi can therefore be written:

$$\tau_{O_i} = \begin{Bmatrix} F_{x_i} & 0 \\ F_{y_i} & 0 \\ F_{z_i} & 0 \end{Bmatrix}_{(\vec{x_1},\vec{y_1},\vec{z_1})}$$ [Math. 1]

By transporting the elementary torsors of each sensor to the origin of the reference frame of the dynamometer O, it is possible to determine the contribution of each measurement direction of each of the sensors in the reading of the overall forces.

The theoretical or overall calibration matrix is then calculated on the basis of these various equations.

The position of the centre Oi of each sensor is defined in a cylindrical coordinate system by a radius R corresponding to the distance OOi and an angle βi. Each sensor has its own direct reference frame (Oi, xi, yi, zi) and their x-axes are co-linear with the straight line (OOi).

The transporting of the torsors of each sensor to the origin and in the reference frame of the dynamometer is given by the following equation;

$$\left({}_{O_i}\{\tau_i\}\right)_{(\vec{x_1},\vec{y_1},\vec{z_1})} = \begin{Bmatrix} \vec{R_t} = F_i x.\vec{x_i} + F_i y.\vec{y_i} + F_i z.\vec{z_i} \\ \vec{M_{iO}} = \vec{OO_i} \wedge \vec{R_t} \end{Bmatrix}$$ [Math. 2]

The various changes of reference frame are as follows:

$$\begin{bmatrix} \vec{x_1} \\ \vec{y_1} \\ \vec{z_1} \end{bmatrix} = \begin{bmatrix} 0 & 1 & 0 \\ 1 & 0 & 0 \\ 0 & 0 & -1 \end{bmatrix} \begin{bmatrix} \vec{X} \\ \vec{Y} \\ \vec{Z} \end{bmatrix}.$$ [Math. 3]

$$\begin{bmatrix} \vec{x_2} \\ \vec{y_2} \\ \vec{z_2} \end{bmatrix} = \begin{bmatrix} \cos\beta_2 & -\sin\beta_2 & 0 \\ -\sin\beta_2 & -\cos\beta_2 & 0 \\ 0 & 0 & -1 \end{bmatrix} \begin{bmatrix} \vec{X} \\ \vec{Y} \\ \vec{Z} \end{bmatrix}.$$ [Math. 4]

$$\begin{bmatrix} \vec{x_3} \\ \vec{y_3} \\ \vec{z_3} \end{bmatrix} = \begin{bmatrix} \sin\beta_3 & \cos\beta_3 & 0 \\ \cos\beta_3 & -\sin\beta_3 & 0 \\ 0 & 0 & -1 \end{bmatrix} \begin{bmatrix} \vec{X} \\ \vec{Y} \\ \vec{Z} \end{bmatrix}.$$ [Math. 5]

After simplification, the expression of the torsors of each sensor at the origin and in the reference frame of the dynamometer can then be written:

[Math. 6]

$$M = \begin{pmatrix} 0 & KF_{1x_1} & 0 & 0 & 0 & 0 \\ KF_{1y_1} & 0 & 0 & 0 & 0 & -RKF_{1y_1} \\ 0 & 0 & KF_{1z_1} & -RKF_{1z_1} & 0 & 0 \\ \frac{\sqrt{3}}{2}KF_{2x_2} & -\frac{1}{2}KF_{2x_2} & 0 & 0 & 0 & 0 \\ -\frac{1}{2}KF_{2y_2} & -\frac{\sqrt{3}}{2}KF_{2y_2} & 0 & 0 & 0 & -RKF_{2y_2} \\ 0 & 0 & -KF_{2z_2} & \frac{R}{2}KF_{2z_2} & \frac{R\sqrt{3}}{2}KF_{2z_2} & 0 \\ \frac{1}{2}KF_{3x_3} & \frac{\sqrt{3}}{2}KF_{3x_3} & 0 & 0 & 0 & 0 \\ \frac{\sqrt{3}}{2}KF_{3y_3} & -\frac{1}{2}KF_{3y_3} & 0 & 0 & 0 & RKF_{3y_3} \\ 0 & 0 & -KF_{3z_3} & \frac{R}{2}KF_{3z_3} & -\frac{R}{2}KF_{3z_3} & 0 \end{pmatrix}$$

This calibration matrix is theoretical. It represents the contribution of the various axes of the sensors in the measurement of the forces of the dynamometer. These measurements depend on the sensitivity K of the piezoelectric sensors used. In reality, no term in the matrix is zero because, despite the care given to production, and whatever the manufacturing processes, geometric defects appear. However, the preponderant terms must be identifiable.

Once the theoretical calibration matrix is written, calibration can be carried out. It consists in correlating the controlled unit loads applied to the dynamometer with the various electrical signals delivered by the triaxial sensors.

It is useful to apply the identified loads at strategic points where the theoretical response of the dynamometer is known. Through linear optimisation, it is possible to correlate the values of the sensors with the expected values. The calibration matrix is determined by means of a test campaign.

The results of the linear optimisation give the following actual calibration matrix:

$$M=\left\{\begin{matrix} 29.9 & 211.82 & 51 & 2.064 & 0.92 & -1.24 \\ 239.16 & -31.5 & 7.46 & -2.89 & -2.09 & -10.89 \\ -14.09 & 20.76 & 218.68 & 27.03 & 7.38 & -1.3 \\ 153.75 & -105.99 & -92.16 & -9.75 & -4.54 & 0.22 \\ -115.35 & -197.9 & 22.5 & -10.08 & -1.98 & -8.064 \\ 12.18 & -25.82 & 609.9 & -31.03 & -37.23 & -0.48 \\ 179.30 & 126.33 & -11.7 & 7.78 & -1.42 & -0.44 \\ 111.90 & -200 & 19.18 & -1.6 & -9.83 & 10.31 \\ -19.43 & -1.13 & 651.04 & 17.58 & -15.51 & 3.41 \end{matrix}\right\} \quad \text{[Math. 7]}$$

Figure 2:
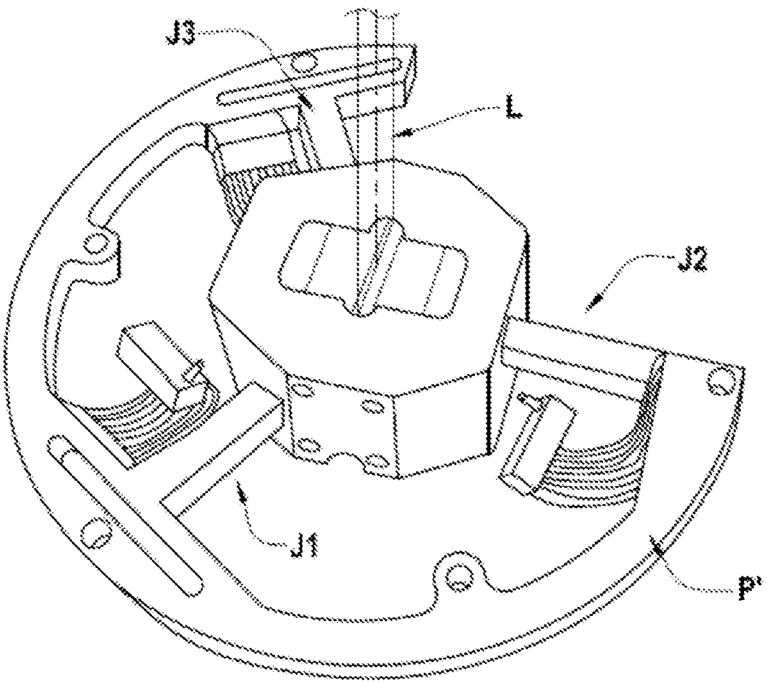
FIG. 2 shows a schematic view showing a second embodiment of implementation of the method according to the invention.

FIG. 2 shows a second embodiment of implementation of the invention, wherein the method envisages positioning a dynamometer with coupled gauges.

More precisely, the dynamometer comprises at least three and preferably six coupled strain gauge bridges which are mounted on arms of the presser foot P' distributed around a longitudinal axis Z of the blade L in order to form at least three and preferably six full bridges.

In order to guarantee good reading of the forces, the dynamometer has been constructed around the axis of the blade with the arms spaced at 120°. The three gauges J1 to J3 forming the six gauge bridges are glued, preferably equidistant from the axis of the blade and on inclined faces, the extensions of which meet at the point of application of the forces.

Longitudinal/transverse double strain gauges J1 to J3 are used and arranged on each face of each of the arms such that each half-bridge is in opposition. A total of at least three full bridges is necessary for the instrumentation of this dynamometer.

The calibration consists in matching a known action torsor with a value of strain measured by the gauge bridges.

Considering that the gauge bridges are ideally centred on the arms of the test body, the respective centres of the bridges Oi (i=i:6) placed on each arm are coincident. They are then remote from the centre of the sensor O by a value r and orientated at an angle α. Finally, the point of application of the forces on the blade is moved by −h following the axis Z to the point Q.

The following known action torsor [T] is applied at point Q:

$$[T]=\begin{bmatrix} F_x & M_x \\ F_y & M_y \\ F_z & M_z \end{bmatrix} \quad \text{[Math. 8]}$$

The movement of this torsor [T] at each measurement point of the gauge bridges makes it possible to know the contribution of each of the axes of the bridges in the reading of the forces.

In order to measure the torsional moment Mz, a force is applied along the axis Y, at the point Q with a lever arm of distance 1.

For clarity, the grouped reference frames are renamed as follows:

$$(O_1\_O_2, X_1\_X_2, Y_1\_Y_2, Z_1\_Z_2)=R_1$$

$$(O_3\_O_4, X_3\_X_4, Y_3\_Y_4, Z_3\_Z_4)=R_2$$

$$(O_5\_O_6, X_5\_X_6, Y_5\_Y_6, Z_5\_Z_6)=R_3 \quad \text{[Math. 9]}$$

These transports then give:

[Math. 10]

$$[F_x]=\begin{bmatrix} F_x & 0 \\ 0 & -h.F_x \\ 0 & r.F_x \end{bmatrix}_{(R_1)} \begin{bmatrix} F_x & 0 \\ 0 & -h.F_x \\ 0 & -r.\sin\alpha.F_x \end{bmatrix}_{(R_2)} \begin{bmatrix} F_x & 0 \\ 0 & -h.F_x \\ 0 & -r.\sin\alpha.F_x \end{bmatrix}_{(R_3)}$$

$$[F_y]=\begin{bmatrix} 0 & h.F_y \\ F_y & 0 \\ 0 & 0 \end{bmatrix}_{(R_1)} \begin{bmatrix} 0 & h.F_y \\ F_y & 0 \\ 0 & -r.\cos\alpha.F_y \end{bmatrix}_{(R_2)} \begin{bmatrix} 0 & h.F_y \\ F_y & 0 \\ 0 & r.\cos\alpha.F_y \end{bmatrix}_{(R_3)}$$

$$[R_z]=\begin{bmatrix} 0 & r.F_y \\ 0 & 0 \\ F_z & 0 \end{bmatrix}_{(R_1)} \begin{bmatrix} 0 & r.\sin\alpha.F_z \\ 0 & r.\cos\alpha.F_z \\ F_z & 0 \end{bmatrix}_{(R_2)} \begin{bmatrix} 0 & r.\sin\alpha.F_z \\ 0 & -r.\cos\alpha.F_z \\ F_z & 0 \end{bmatrix}_{(R_3)}$$

$$[M_x]=\begin{bmatrix} 0 & -l.F_z-r.F_z \\ 0 & 0 \\ F_z & 0 \end{bmatrix}_{(R_1)} \begin{bmatrix} 0 & -l.F_z-r.\sin\alpha.F_z \\ 0 & r.\cos\alpha.F_z \\ F_z & 0 \end{bmatrix}_{(R_2)} \begin{bmatrix} 0 & -l.F_z-r.\sin\alpha.F_z \\ 0 & -r.\cos\alpha.F_z \\ F_z & 0 \end{bmatrix}_{(R_3)}$$

$$[M_y]=\begin{bmatrix} 0 & -r.F_z \\ 0 & -l.F_z \\ F_z & 0 \end{bmatrix}_{(R_1)} \begin{bmatrix} 0 & r.\sin\alpha.F_z \\ 0 & -l.F_z+r.\cos\alpha.F_z \\ F_z & 0 \end{bmatrix}_{(R_2)} \begin{bmatrix} 0 & r.\sin\alpha.F_z \\ 0 & -l.F_z-r.\cos\alpha.F_z \\ F_z & 0 \end{bmatrix}_{(R_3)}$$

$$[M_z]=\begin{bmatrix} 0 & h.F_y \\ F_y & 0 \\ 0 & l.F_y \end{bmatrix}_{(R_2)} \begin{bmatrix} 0 & h.F_y \\ F_y & 0 \\ 0 & l.F_y-r.\cos\alpha.F_y \end{bmatrix}_{(R_3)} \begin{bmatrix} 0 & h.F_y \\ F_y & 0 \\ 0 & l.F_y+r.\cos\alpha.F_y \end{bmatrix}_{(R_3)}$$

These values give the components of the theoretical calibration matrix. Now, by taking account of the fact that the strain gauges only react along their axis Z, it is possible to simplify the matrix. It is then written:

[Math. 11]

$$[M_{Th}] = \begin{bmatrix} 0 & 0 & K.F_1 & R.K.F_1 & 0 & 0 \\ K.F_2 & 0 & 0 & 0 & 0 & -R.K.F_2 \\ 0 & 0 & K.F_3 & -\frac{R}{2}.K.F_3 & -\frac{R.\sqrt{3}}{2}.K.F_3 & 0 \\ -\frac{1}{2}.K.F_4 & -\frac{\sqrt{3}}{2}K.F_4 & 0 & 0 & 0 & -R.K.F_4 \\ 0 & 0 & K.F_5 & -\frac{R}{2}.K.F_5 & \frac{R}{2}.K.F_5 & 0 \\ -\frac{1}{2}.K.F_6 & \frac{\sqrt{3}}{2}.K.F_6 & 0 & 0 & 0 & -R.K.F_6 \end{bmatrix}_{(O,X,Y,Z)}$$

With K designating the sensitivity of each gauge bridge (here assumed common), and $F_i$ the strain measured by gauge bridge i.

The following step of developing the actual calibration matrix consists in applying the known forces along well defined axes and recording the reaction of each half bridge.

This calibration method provides a very large number of data which imposes a certain optimisation. The signal-load relations being assumed linear, a direct method based on the least-squares method is applied.

The approach aims to minimise the least squares of the differences between the imposed values and the measured values according to a linear response model. To this effect, we seek to express $[A_{i,j}]$, the calibration matrix, using n measurements $[m_i]$ delivering n different torsors $[T_j]$. The equation can be written in the following manner:

$$[T_j]=[A_{ij}]\times[m_i] \qquad \text{[Math. 12]}$$

The following formatting enables the terms aij of the solution matrix $[A]^t$ to be calculated using the linear optimisation method, identical to the solution of the normal equation of the preceding equation.

$$[T_j]^t=[m_i]^t\times[A_{ij}]^t,$$

$$[m_i]\times[m_i]^t\times[A_{ij}]^t=[m_i]\times[T_j]^t,$$

$$[A_{ij}]^t=[[m_i]\times[m_i]^t]^{-1}\times[m_i]\times[T_j]^t. \qquad \text{[Math. 13]}$$

By way of illustration, the matrix thus obtained for each sensor is thus given by:

[Math. 14]

$$[A_{ij}]_{C1} = \begin{bmatrix} 0.22743549 & 0.02364623 & -0.13343276 & -0.0060998 & -0.00087995 & -0.00130383 \\ 0.68420348 & 0.15332142 & 0.03105618 & 0.00189647 & -0.00466481 & -0.00561201 \\ -0.1076689 & -0.12158194 & -0.14872792 & 0.0026323 & 0.00625291 & -0.00187975 \\ -0.46440179 & -0.61847475 & 0.02114317 & -0.00536206 & 0.00200904 & -0.00811313 \\ 0.1368964 & 0.09598388 & -0.13872592 & 0.00413322 & -0.00556786 & -0.00241526 \\ -0.11003649 & 0.54635391 & 0.0378909 & 0.00408779 & 0.00172092 & -0.01026037 \end{bmatrix}$$

$$[A_{ij}]_{C2} = \begin{bmatrix} 0.28085142 & -0.01953047 & -0.13864593 & -0.00647811 & -0.00211027 & -0.00173131 \\ 0.77073137 & 0.2172864 & 0.03597984 & 0.00417099 & -0.00554774 & -0.01009237 \\ -0.1351971 & -0.133147 & -0.14704929 & 0.00216863 & 0.00632671 & -0.0071048 \\ -0.56057634 & -0.5967342 & 0.03491581 & -0.00588278 & 0.0036103 & -0.00579446 \\ 0.0178842 & 0.05183176 & -0.14780865 & 0.00307678 & -0.00576331 & -0.00131784 \\ -0.18893259 & 0.44976418 & 0.02836511 & 0.00192248 & 0.0018153 & -0.00829667 \end{bmatrix}$$

$$[A_{ij}]_{C3} = \begin{bmatrix} 0.31053699 & -0.02206733 & -0.13963957 & -0.00646137 & -0.00181698 & -0.00022063 \\ 0.69569874 & 0.31291328 & 0.0099921 & 0.00234984 & -0.00486212 & -0.01067891 \\ -0.14114808 & -0.16467566 & -0.1430152 & 0.00293031 & 0.00641895 & -0.00096274 \\ -0.67494056 & -0.65437313 & 0.05252109 & -0.00309514 & 0.00386065 & -0.0086002 \\ 0.07045973 & -0.00230579 & -0.1414674 & 0.0031475 & -0.00633642 & -0.00048254 \\ -0.04925843 & 0.46419488 & 0.03133913 & 0.00144251 & 0.0015364 & -0.00759894 \end{bmatrix}$$

The sensors all being different according to the inherent variabilities in the machining and the gluing of the gauges, it is impossible to obtain an identical matrix. However, the reaction of each sensor to each matrix is good. It is possible to obtain a matrix smoothing the behaviour of each sensor, this matrix, referred to as the merged matrix, takes into consideration all of the calibration measurements of the three sensors (see the example below).

[Math. 15]

$$[A_{ij}]_F = \begin{bmatrix} 0.25775426 & -0.0169919 & -0.13482656 & -0.00603876 & -0.00140795 & -0.00169831 \\ 0.77567 & 0.18216929 & 0.03188821 & 0.00304868 & -0.00563973 & -0.00803284 \\ -0.12965247 & -0.13159113 & -0.14806411 & 0.00231931 & 0.00633665 & -0.00120715 \\ -0.53481395 & -0.65440946 & 0.02423596 & -0.00644915 & 0.00265166 & -0.0062482 \\ 0.01615932 & -0.09425864 & -0.14100178 & 0.00393699 & -0.00535424 & -0.0020892 \\ -0.16085048 & 0.55349909 & 0.03862418 & -0.00395377 & 0.00233197 & -0.01006808 \end{bmatrix}$$

After checks, it is observed that the response of the three sensors to this matrix is generally very close and the measurement deviation is very low.

Figure 3:
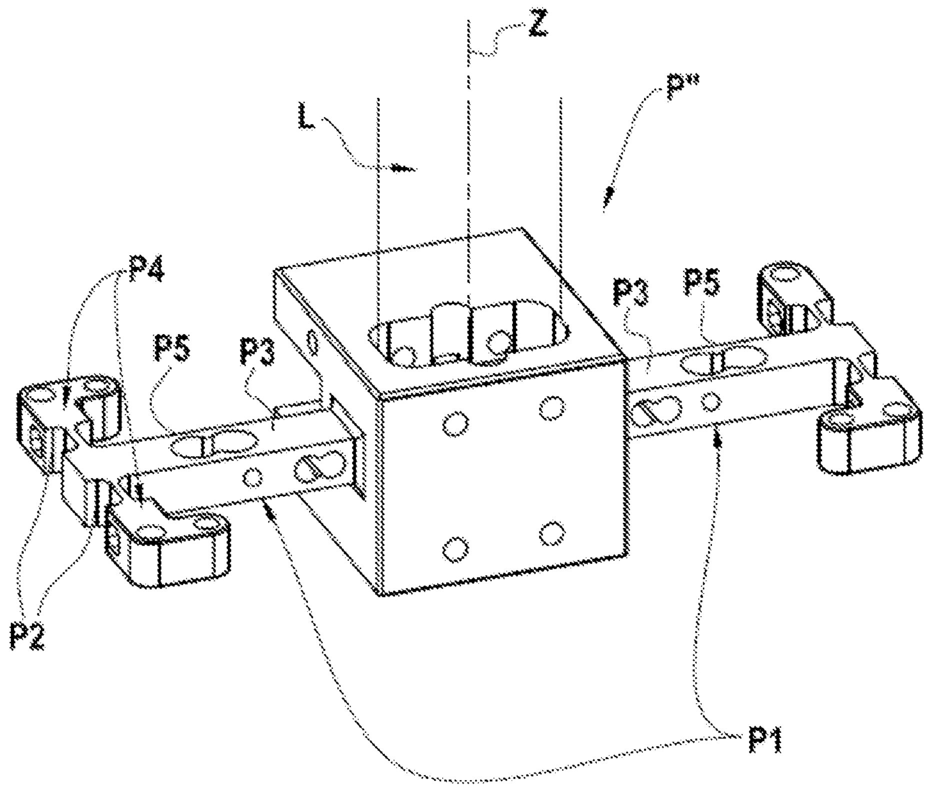
FIG. 3 shows a schematic view showing a third embodiment of implementation of the method according to the invention.

FIG. 3 shows a third embodiment of implementation of the invention, wherein the method envisages positioning a dynamometer with decoupled gauges.

As shown in this figure, FIG. 3, the dynamometer thus comprises five gauge bridges as full bridges mounted in the presser foot P". The gauges used are half-bridge rosettes in order to guarantee reading of the forces in the two possible bending directions (for reasons of clarity, only the five gauge bridges P1 to P5 are shown in FIG. 3).

The actual calibration matrix is obtained by measuring the strains at the positions of the strain gauges and by making the calculation relating to the wiring of the bridges. By way of example, a result is visible in the table below:

TABLE 1

| | Fx (%) | Fy (%) | Mx (%) | My (%) | Mz (%) |
|---|---|---|---|---|---|
| Bridge 1 | — | 0.03 | 0.27 | 5.61 | 0.2 |
| Bridge 2 | 1.53 | — | 0.36 | 0.85 | 0.28 |
| Bridge 3 | 0 | 4.48 | — | 0.15 | 0.03 |
| Bridge 4 | 2.49 | 0.12 | 0.15 | — | 2.26 |
| Bridge 5 | 0.08 | 4.52 | 0.02 | 1.5 | — |

It is observed that the largest coupling obtain is 5.61% strain read by bridge 1 during the application of a moment My.

It is also observed that this embodiment does not require the prior step of developing a theoretical calibration matrix.

It is noted that whatever the embodiment, the transmission of measurements from the strain sensors of the dynamometer is performed contact free or by wire.

It is also noted that whatever the embodiment, a set of electronic cards is provided between the piezoelectric sensors or the strain gauge bridges and the computer station exploiting the received information. These electronic cards perform the following functions: supply and conditioning of the signals coming from the sensors (as a function of the type of these sensors), filtering and amplification of signals suitable for the input range of the analogue-to-digital converter, analogue-to-digital conversion, and serialisation and transmission of the data to the computer station.

The invention claimed is:

1. A method for determining components of a mechanical action torsor at the guiding point of a cutting blade for a cutting machine, the blade being guided in a presser foot of a cutting head of the machine, the method comprising:

positioning a five-component dynamometer on the presser foot, the dynamometer comprising a plurality of sensors capable of determining a frontal force, a lateral force, a rolling moment, a pitching moment and a yawing moment of the cutting blade;

establishing a calibration matrix of the dynamometer; and determining the forces in three dimensions to which the cutting blade is subjected, on the basis of measurements obtained by the sensors and the calibration matrix.

2. The method according to claim 1, wherein the step of developing the calibration matrix of the dynamometer comprises developing a theoretical calibration matrix of the sensors of the dynamometer at various theoretical stresses as a function of the components of the dynamometer.

3. The method according to claim 2, wherein the step of developing the calibration matrix of the dynamometer further comprises, on the basis of the theoretical calibration matrix and actual response measurements of the sensors of the dynamometer, calculating a response matrix of the sensors of the dynamometer at various actual stresses as a function of the components of the dynamometer.

4. The method according to claim 3, wherein the response matrix of the sensors of the dynamometer is calculated by a linear optimization method.

5. The method according to claim 1, wherein the dynamometer comprises three triaxial piezoelectric sensors which are mounted in the presser foot being distributed around a longitudinal axis of the blade.

6. The method according to claim 1, wherein the dynamometer comprises at least three coupled strain gauge bridges which are mounted on arms of the presser foot regularly distributed around a longitudinal axis of the blade in order to form at least three full bridges.

7. The method according to claim 6, wherein the dynamometer comprises six strain gauge bridges regularly distributed around the longitudinal axis of the blade in order to form six full bridges.

8. The method according to claim 1, wherein the dynamometer comprises at least five decoupled strain gauge bridges which are mounted on the presser foot.

9. The method according to claim 1, wherein the transmission of the measurements of the sensors of the dynamometer is performed contact free or by wire.

* * * * *